United States Patent
Chen et al.

(10) Patent No.: US 11,237,748 B2
(45) Date of Patent: *Feb. 1, 2022

(54) PLANNING OF DATA SEGMENT MERGE FOR DISTRIBUTED STORAGE SYSTEM

(71) Applicant: International Business Machines Corporation, Armonk, NY (US)

(72) Inventors: Lei Chen, Shanghai (CN); Xin Ni, Shanghai (CN); Tao Xie, Shanghai (CN); Jun Wei Zhang, Shanghai (CN)

(73) Assignee: International Business Machines Corporation, Armonk, NY (US)

(*) Notice: Subject to any disclaimer, the term of this patent is extended or adjusted under 35 U.S.C. 154(b) by 19 days.

This patent is subject to a terminal disclaimer.

(21) Appl. No.: 16/539,392

(22) Filed: Aug. 13, 2019

(65) Prior Publication Data

US 2019/0369900 A1 Dec. 5, 2019

Related U.S. Application Data

(63) Continuation of application No. 15/408,514, filed on Jan. 18, 2017, now Pat. No. 10,552,079.

(51) Int. Cl.
*G06F 12/00* (2006.01)
*G06F 3/06* (2006.01)

(52) U.S. Cl.
CPC .......... *G06F 3/0647* (2013.01); *G06F 3/067* (2013.01); *G06F 3/0611* (2013.01)

(58) Field of Classification Search
CPC ....... G06F 3/0647; G06F 3/0611; G06F 3/067
See application file for complete search history.

(56) References Cited

U.S. PATENT DOCUMENTS

| | | | |
|---|---|---|---|
| 7,529,903 B2 | 5/2009 | Boss et al. | |
| 7,676,513 B2 | 3/2010 | McSherry et al. | |
| 8,086,594 B1* | 12/2011 | Cao | G06F 16/313 |
| | | | 707/713 |
| 8,229,916 B2 | 7/2012 | Narang et al. | |
| 8,935,702 B2 | 1/2015 | Harris et al. | |
| 9,171,031 B2 | 10/2015 | Dhuse et al. | |
| 9,531,809 B1 | 12/2016 | Brooker et al. | |
| 10,749,766 B1* | 8/2020 | O'Shea | G06F 16/2455 |
| 10,762,139 B1* | 9/2020 | Dai | G06F 16/2246 |
| 2005/0172097 A1 | 8/2005 | Voigt et al. | |
| 2006/0116989 A1 | 6/2006 | Bellamkonda et al. | |
| 2009/0193406 A1 | 7/2009 | Williams | |
| 2010/0223297 A1 | 9/2010 | Li et al. | |
| 2011/0010330 A1 | 1/2011 | McCline et al. | |
| 2014/0280298 A1* | 9/2014 | Petride | G06F 16/24553 |
| | | | 707/769 |
| 2015/0227399 A1 | 8/2015 | Chin et al. | |
| 2016/0019265 A1* | 1/2016 | Subramanian | G06F 16/24564 |
| | | | 707/693 |

OTHER PUBLICATIONS

List of related applications; 2019.

* cited by examiner

*Primary Examiner* — David Yl
*Assistant Examiner* — Tahilba O Puche
(74) *Attorney, Agent, or Firm* — Alex Harvey (57) ABSTRACT

Balancing resource usage for client applications workload and data merge optimization of the backend for both a local merge within one server and a merge across multiple servers is determined based on previous resource usage pattern in a distributed storage system.

12 Claims, 7 Drawing Sheets

PLANNING OF DATA SEGMENT MERGE FOR DISTRIBUTED STORAGE SYSTEM

BACKGROUND

The present invention relates to distributed storage systems, and more specifically to planning of data segment merge for distributed storage systems based on historical behavior.

For massive distributed storage solutions, for improving parallel writing performance, multiple segments of a chunk of data are created so that more nodes and disk spindles can be leveraged. But, having too many data segments also has a negative impact on data query performance To overcome this issue, many distributed data storage systems have a compaction mechanism to merge smaller segments into larger ones for improving query performance.

At the front end of the massive distributed storage system, clients create, read, write, and delete data which is stored on storage disks as multiple replicas. Meanwhile, the system picks up one set of data and requires resources from datanodes for data segment optimization (e.g. segment merge in ElasticSearch).

However, system resources are limited, including server CPU, disks, network, and network bandwidth. If there is real-time application input/output (I/O) at the front end, and internal merging takes place at the same time, the bandwidth of specific servers is occupied, and dramatically impacts the real-time application I/O. Without monitoring and recognition of resource usage, the resource workload is not optimally controlled for an external user nor is the resource workload adjusted intelligently in the background of the system.

SUMMARY

According to one embodiment of the present invention, a method of planning data segment merging within a distributed storage system is disclosed. The distributed storage system comprising a plurality of data node servers, the data node servers each comprising a plurality of data segments, the plurality of data node servers in communication with: a client application through an interface, a disk, and a data merge engine. The method comprising the steps of: a computer collecting a record of usage statistics of the distributed storage system; the computer analyzing a historical record of usage statistics collected to determine at least one usage pattern of the distributed storage system; the computer estimating a workload of each of the plurality of data node servers and a length of time for merge optimization; and the computer determining a plan for merging and sending the plan to the plurality of data node servers for implementation. The plan for merging has a first stage and a second stage of merging of data segments across a plurality of data node servers, comprises the steps of: the computer sorting all data size of data segments in an index on all data node servers; the computer choosing a data node server with a minimum data size; the computer setting a merge rate for the data node server chosen; and the computer executing a merge of the data segments into a single data segment for the index for the data node server chosen.

According to another embodiment of the present invention, a computer program product for planning data segment merging within a distributed storage system is disclosed. The distributed storage system comprising a plurality of data node servers, the data node servers each comprising a plurality of data segments, the plurality of data node servers in communication with: a client application through an interface, a disk, a data merge engine, and a computer comprising at least one processor, one or more memories, one or more computer readable storage media, the computer program product comprising a computer readable storage medium having program instructions embodied therewith. The program instructions executable by the computer to perform a method comprising: collecting, by the computer, a record of usage statistics of the distributed storage system; analyzing, by the computer, a historical record of usage statistics collected to determine at least one usage pattern of the distributed storage system; estimating, by the computer, a workload of each of the plurality of data node servers and a length of time for merge optimization; and determining, by the computer, a plan for merging and sending, by the computer, the plan to the plurality of data node servers for implementation. The plan for merging has a first stage and a second stage of merging of data segments across a plurality of data node servers comprising the program instructions of: sorting, by the computer, all data size of data segments in an index on all data node servers; choosing, by the computer, a data node server with a minimum data size; setting, by the computer, a merge rate for the data node server chosen; and executing, by the computer, a merge of the data segments into a single data segment for the index for the data node server chosen.

According to another embodiment of the present invention, a computer system for planning data segment merging within a distributed storage system is disclosed. The distributed storage system comprising a plurality of data node servers, the data node servers each comprising a plurality of data segments, the plurality of data node servers in communication with: a client application through an interface, a disk, a data merge engine, the data node servers comprising a computer comprising at least one processor, one or more memories, one or more computer readable storage media having program instructions executable by the computer to perform the program instructions. The program instructions comprising: collecting, by the computer, the distributed storage system, computer processors and network usage; analyzing, by the computer, a historical record of usage statistics collected to determine at least one usage pattern of the distributed storage system; estimating, by the computer, a workload of each of the plurality of data node servers and a length of time for merge optimization; and determining, by the computer, a plan for merging and sending, by the computer, the plan to the plurality of data node servers for implementation. The plan for merging has a first stage and a second stage of merging of data segments across a plurality of data node servers comprising the program instructions of: sorting, by the computer, all data size of data segments in an index on all data node servers; choosing, by the computer, a data node server with a minimum data size; setting, by the computer, a merge rate for the data node server chosen; and executing, by the computer, a merge of the data segments into a single data segment for the index for the data node server chosen.

DETAILED DESCRIPTION

An embodiment of the present invention balances resource usage for client applications workload and data merge optimization of the backend based on previous resource usage pattern in the distributed storage system. An embodiment of the present invention also provides a solution for both the local merge within one server and the remove merge across multiple servers and considers resource usage when executing merge optimization to have the least impact on the resource usage for any client applications. Furthermore, in an embodiment of the present invention, workload pattern, which is forecasted, is utilized so that workload can be efficiently adjusted as needed.

When there are both client side I/O jobs and back end data segment merge jobs happening in a massive distributed data store system, embodiments of the present invention can estimate workload and resource usage for the CPU, disk and network on each node accurately and balance the usage to finish the client side I/O jobs without much impact and plan to do the data segment merge by using the idle resource.

For massive distributed storage solutions, for improving parallel writing performance, multiple segments of a chunk of data is created, so that more nodes and disk spindles can be leveraged. But having too many data segments also has negative impact on data query performance. To overcome this issue, many distributed data storage systems have the mechanism of doing compaction, to merge smaller segments into larger ones for improving query performance. When there is client application I/O, the client application and back end merge optimization compete for resources. In embodiments of the present invention, resource usage for client applications workload and data merge optimization of back end based on a previous resource usage pattern in the distributed storage system is balanced. In an embodiment of the present invention, the following actions are performed: 1) History Resource Monitoring—collecting all history resource usage records, including: CPU/Network/Data segment usage and data optimization capability on each data node server; 2) Data Resource Analysis—analyzing the history records and determining the usage pattern for CPU, the data segment, the network, and the data merge optimization capability; 3) Data Optimization Planner—estimating the workload and length for the segment merge, planning the stage 1 merge optimization, detecting the readiness of stage 1 for each data collection (e.g. index, table) and planning the stage 2 merge optimization; 4) Data Optimization Executor—executing the optimization plan.

Figure 1:
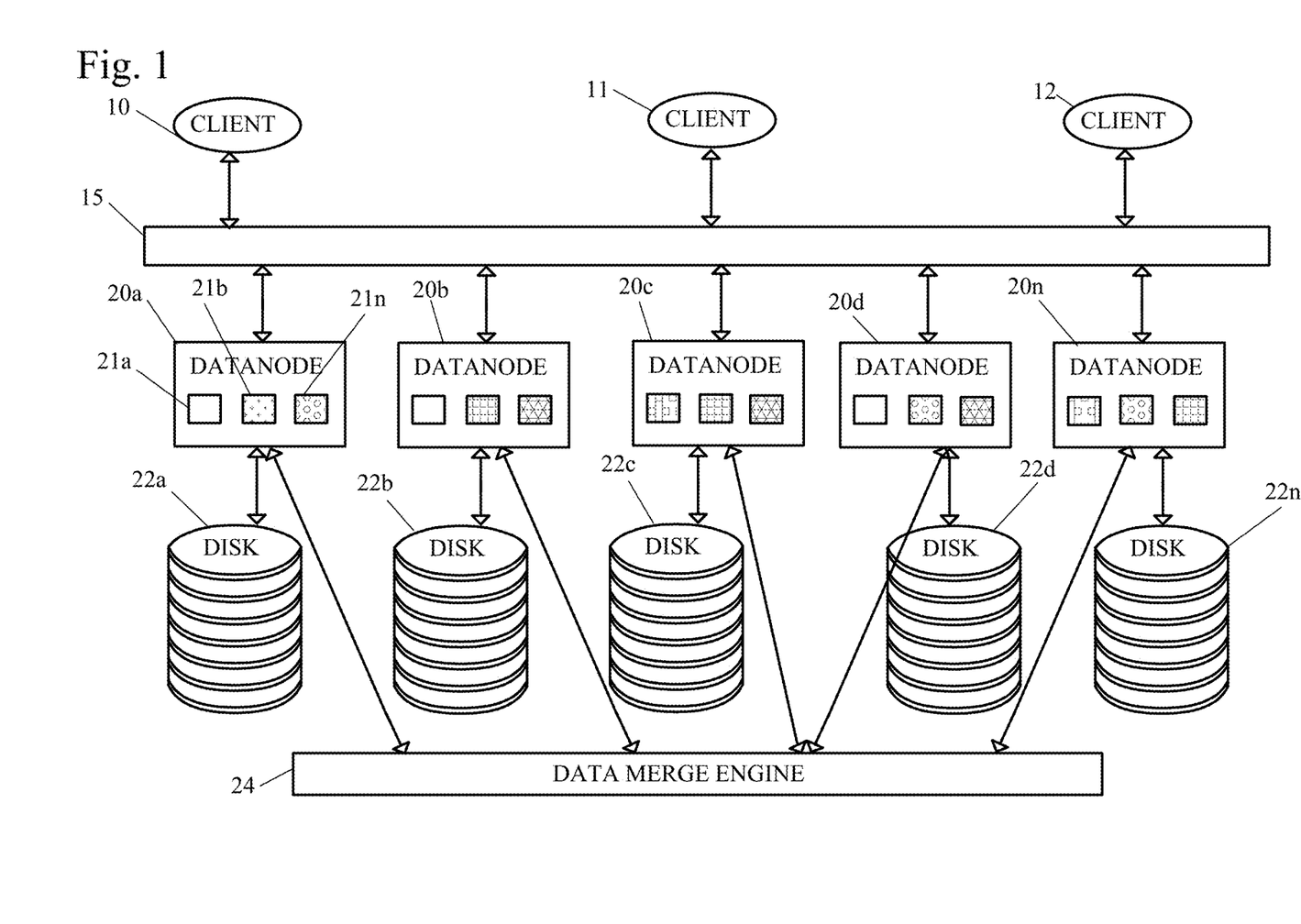
FIG. 1 shows a schematic of a massive distributed storage system with a data merge engine.
Figure 2:
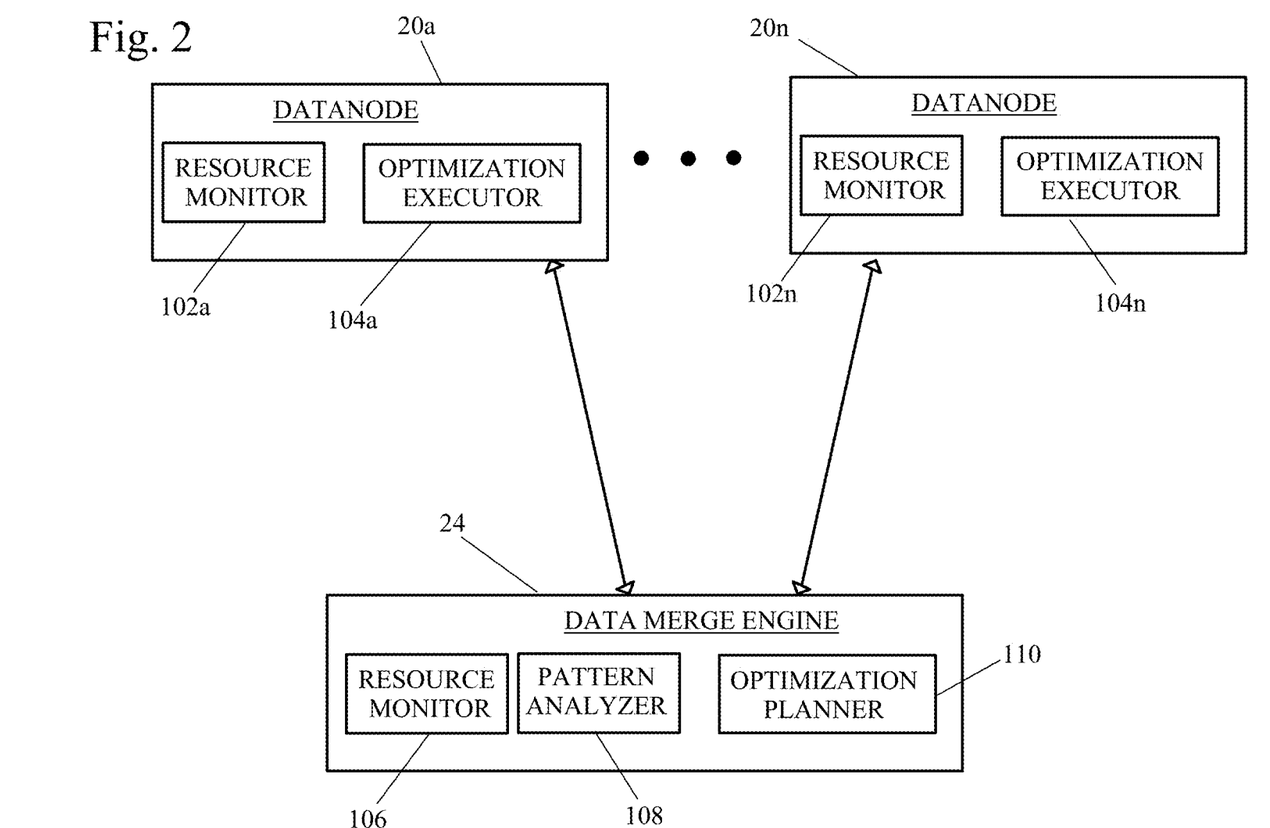
FIG. 2 shows a schematic of a balance resource usage system for the massive distributed storage system.

FIGS. 1-2 shows a schematic of a massive distributed storage system with a data merge engine. A plurality of datanodes 20a-20n, each representing a server, each interact with a disk 22a-22n. Clients 10, 11, 12 interact with the plurality of datanodes 20a-20n through an interface 15. The data within the datanodes 20a-20n is merged using the data merge engine 24. The plurality of datanodes 20a-20n each contain a resource monitor 102a-102n and an optimization executor 104a-104n and data segments indicated by the shaded boxes 21a-21n. The resource monitor 102a-102n monitors the resource usage of the datanode 20a-20n. The resource usage of the datanode may include, but is not limited to: data segment usage inside of the datanode server; CPU usage on the datanode server, network usage of the datanode server, and data optimization capability of the datanode server. The optimization executor 104a-104n executes an optimization plan for the datanode 102a-102n.

The data merge engine 24 includes a resource monitor 106, a pattern analyzer 108, and an optimization planner 110. The resource monitor 106 monitors historical resource usage records of the plurality of datanodes 102a-102n. The historical usage records of the plurality of datanodes 102a-102n may include, but are not limited to: data segment usage inside each datanode server, CPU usage on each datanode server, network usage of the datanode server, and data optimization capability of each datanode server. An example is 20% usage on server1, 10:00-10:20 on August $1^{st}$. The optimization planner 110 estimates the workload and length for the segment merge, plans the stage 1 merge optimization, detects the readiness of stage 1 for each data collection (e.g. index, table), and plans the stage 2 merge optimization.

It should be noted that it is important to track the usage per each data collection, as the future planner will use the usage data at this granularity to work out an optimized plan. Furthermore, by summing up the usage of all collections on each server, the time based usage of each server can be calculated.

Figure 4:
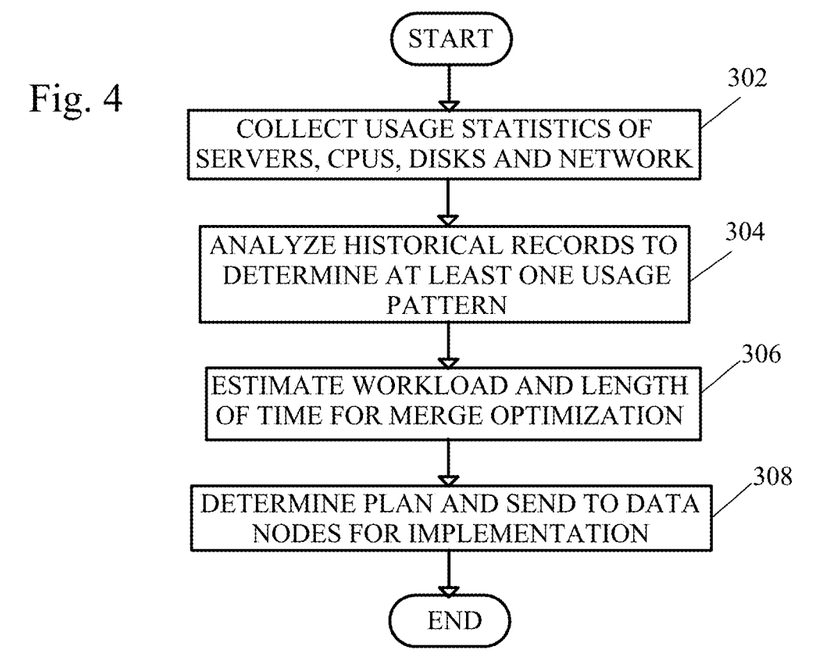
FIG. 4 shows a flow diagram of a method of planning data segment merging for a distributed storage system based on historical behavior.

FIG. 4 shows a flow diagram of a method of planning data segment merging for distributed storage system based on historical behavior.

Usage statistics of servers, CPUs, disks and network are collected (step 302). The usage statistics can be stored in the disks or a repository of the distributed storage system (not shown).

Figure 3A:
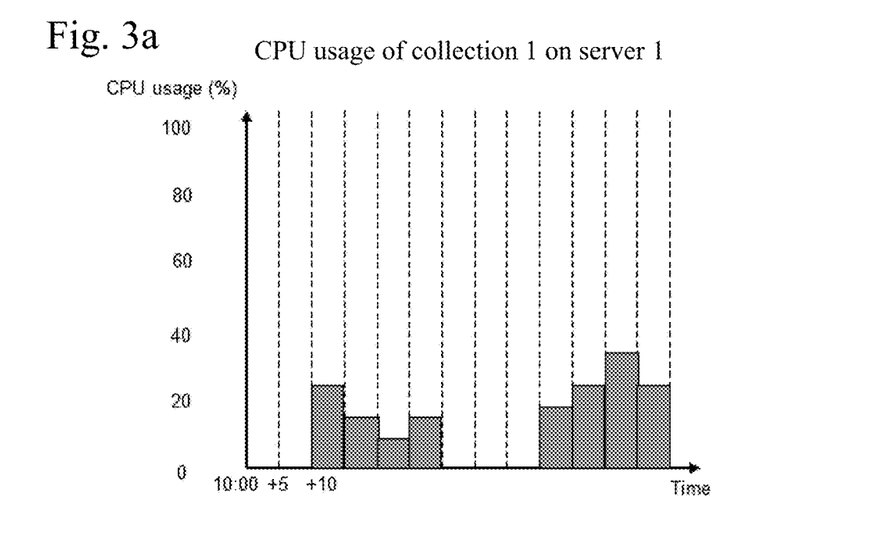
FIG. 3a shows an example of a graph of an example of CPU usage of collection 1 on server 1 displayed as time versus CPU usage.
Figure 3B:
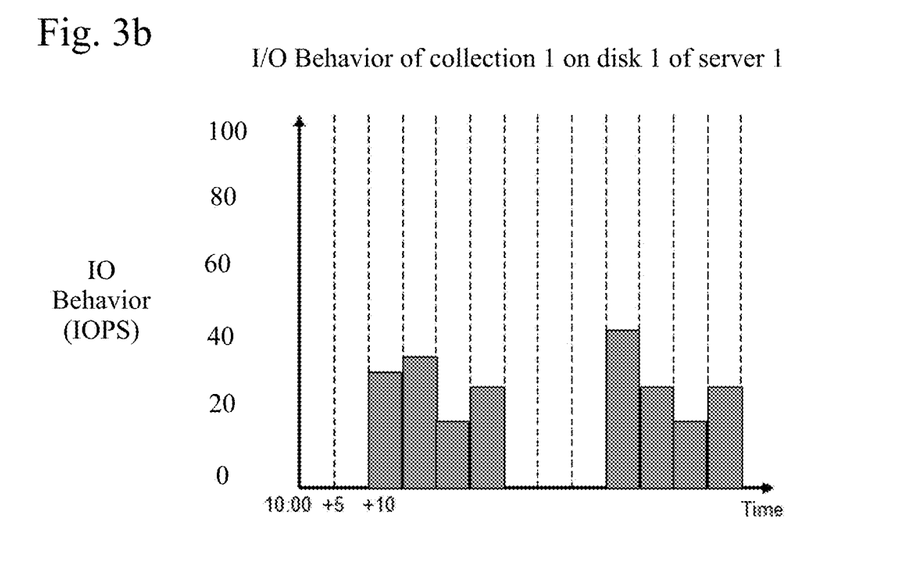
FIG. 3b shows a graph of an example of I/O behavior of collection 1 on disk 1 of server 1 displayed as time versus IO behavior (IOPS).
Figure 3C:
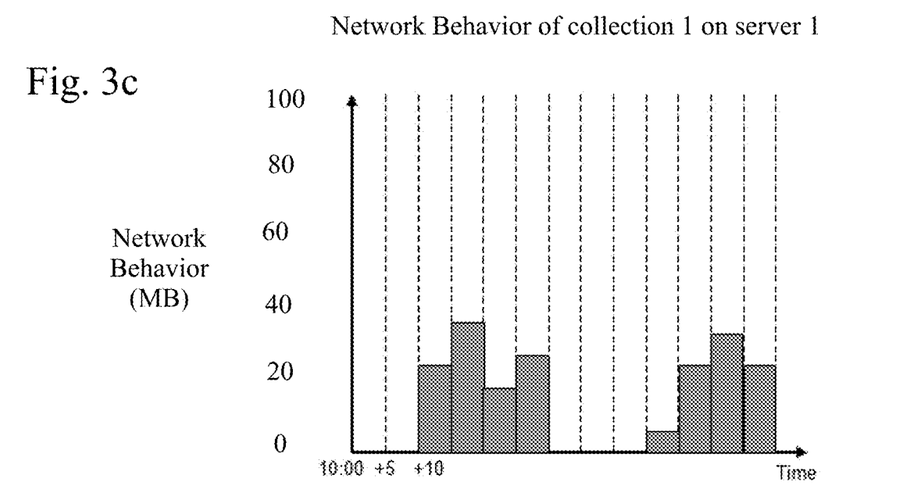
FIG. 3c shows a graph of an example of network behavior of collection 1 on server 1 displayed as time versus network behavior.

The usage statistics may be collected by the resource monitor 106. For example, for CPUs usage I/O and network usage (every 5 minutes), the system records the usage of each data collection (e.g. index, table) for each data server. FIG. 3a shows an example of a graph of an example of CPU usage of collection 1 on server 1 displayed as time versus CPU usage. FIG. 3b shows a graph of an example of I/O behavior of collection 1 on disk 1 of server 1 displayed as time versus IO behavior (IOPS). FIG. 3c shows a graph of an example of network behavior of collection 1 on server 1 displayed as time versus network behavior. It should be noted that the examples given in the Tables below do no correspond to the graphs of FIGS. 3a-3c.

The CPU and disk I/O usage are collected for data segment optimization work on each server. For example, if the data size is 100 MB, by using 50% of CPU, segment optimization lasts 10 seconds, then the optimizability of this server for the segment optimization is 100 MB/50%/10=20 MB per second per CPU, which indicates that the server can finish 20 MB data optimization every second by using the whole CPU.

The historical records are analyzed to determine a usage pattern (step 304).

Referring to Table 1, the CPU usage of each server is calculated using equation 1.1.

TABLE 1

| Server AvgCPU | Time Period | | |
|---|---|---|---|
| | Monday 00:00-00:20 | Monday 00:20-00:40 | ... |
| Server1 AvgCPU | 50% | 30% | ... |
| Server 2 AvgCPU | 20% | 90% | ... |
| ... | ... | ... | ... |

$$AvgServerCPU_{Ti} = \sum_{n=day1}^{dayM} ServerCPU_{Ti}/M \quad (1.1)$$

Where:
M=segment file size
Ti=period of time

An example of network usage for a server is shown in Table 2 and the average server network is calculated with equation 1.2 below.

TABLE 2

| Network I/O | Time Period | | |
|---|---|---|---|
| | Monday 00:00-00:20 | Monday 00:20-00:40 | ... |
| Server 1 Network IO | 50 | 40 | ... |
| Server 2 Network IO | 100 | 35 | ... |
| ... | ... | ... | ... |

$$AvgServerNetwork_{Ti} = \sum_{n=day1}^{dayM} ServerNetwork_{Ti}/M \quad (1.2)$$

Where:
M=segment file size
Ti=period of time

An example of disk usage for a server is shown in Table 3 and the average IO calculated shown in equation 1.3.

TABLE 3

| Disk AvgIO | Time Period | | |
|---|---|---|---|
| | Monday 00:00-00:20 | Monday 00:20-00:40 | ... |
| Server 1 Network IO | 150,000 | 40,000 | ... |
| Disk 2 AvgIO | 100,000 | 200,000 | ... |
| ... | ... | ... | ... |

$$AvgIO_{Ti} = \sum_{n=day1}^{dayM} IO_{Ti}/M \quad (1.3)$$

Where:
M=segment file size
Ti=period of time

An example of data segment optimization of each server is shown in Table 4.

TABLE 4

| Server | Optimizability (MB per second per CPU) |
|---|---|
| Server 1 | 50 |
| Server 2 | 100 |
| ... | ... |

For each data node server, based on its historical behavior records in the past cycle (e.g. 1 month), the possibility of usage and amount during each period of time Ti is calculated.

The workload and length for merge optimization is estimated (step 306). A plan is determined and sent to the data nodes for implementation (step 308) and the method ends.

Figure 5:
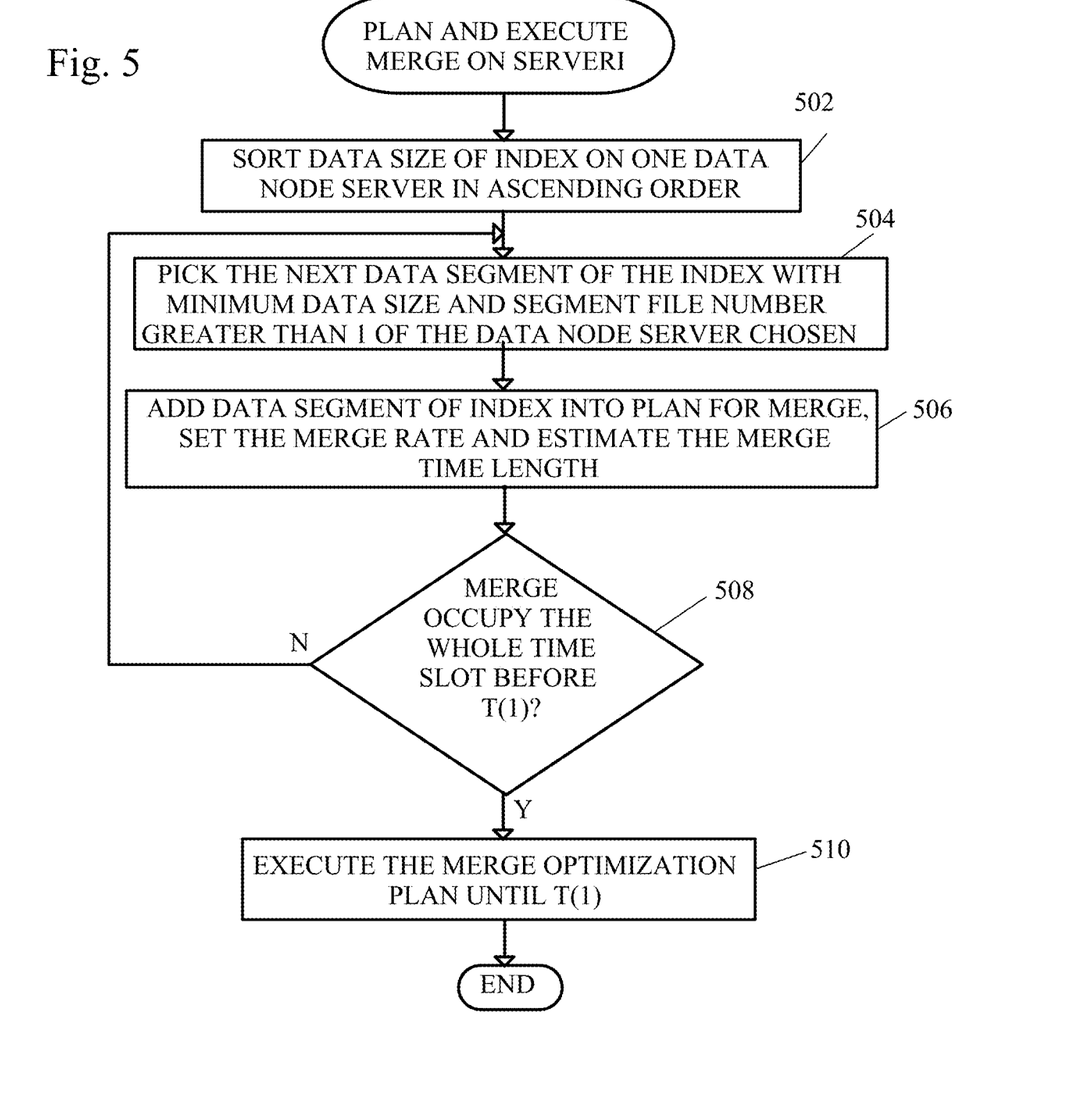
FIG. 5 shows a flow diagram of a method of a stage 1 execution of the data segment merging.
Figure 6:
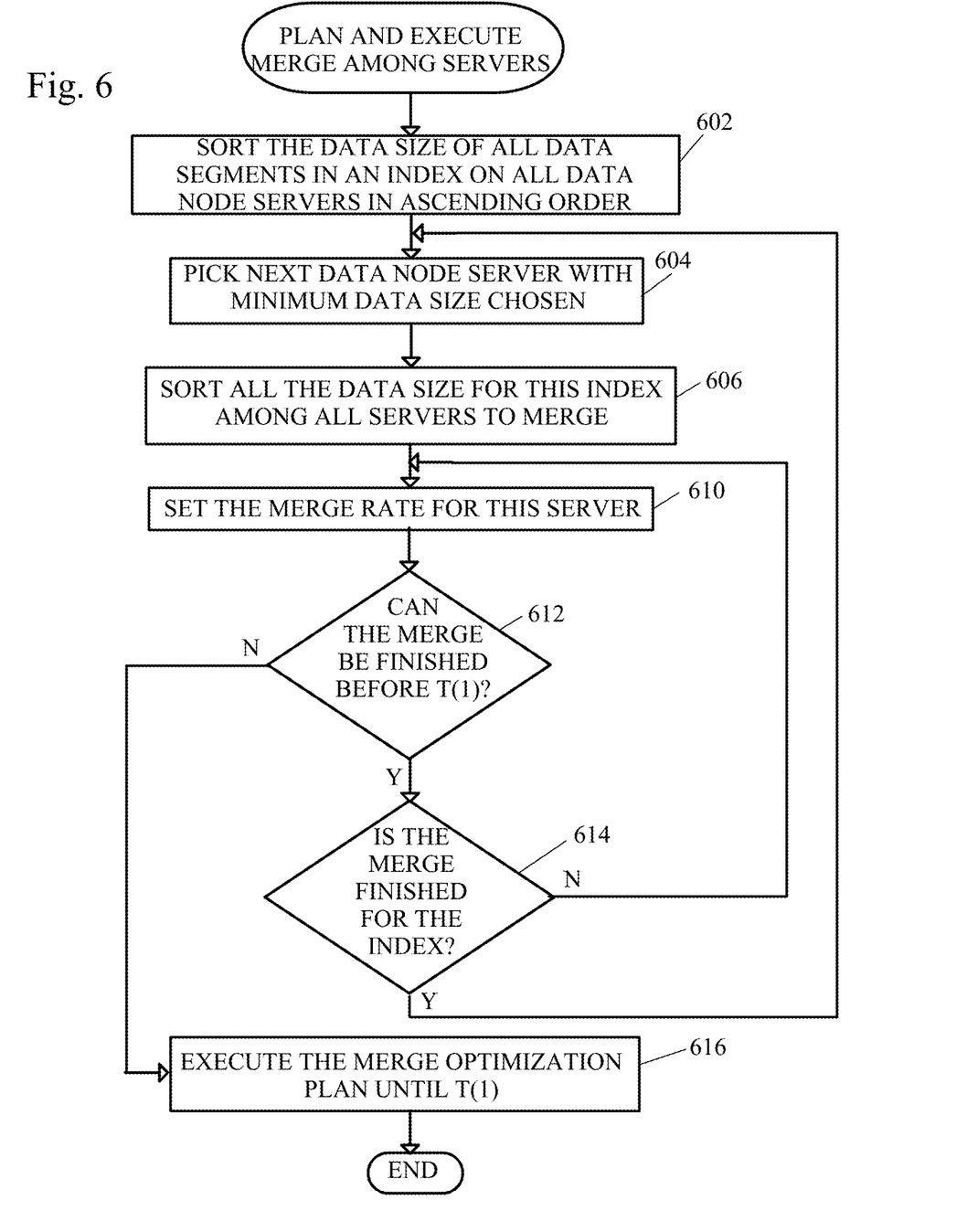
FIG. 6 shows a flow diagram of a method of stage 2 execution of the data segment merging.

The input for the optimization planner are segment file size and the three metrics of network usage pattern, disk usage pattern and CPU usage pattern to output a plan of when and where to merge the segment. The plan includes when and where to merge the segment. The actual merge process has two stages, stage 1 for local merge and stage 2 for cross server merge. A flow diagram of a method of stage 1 for local merge is shown in FIG. 5 and a flow diagram of a method of state 2 for cross server merge is shown in FIG. 6.

State Tracker

A state tracker tracks each index's sub-nodes state. There are four types of index states: INIT, STAGE1_READY, STAGE2_READY, and REMOTE_DEST. The default state for each index is INIT. The state transfer cycle is as below:

INIT→STAGE1_READY: current index is ready for local merge.
STAGE1_READY→STAGE2_READY: current index's local merge has been complete.
STAGE2_READY→INIT: remote merge complete, usually file transfer complete
STAGE1_READY→INIT: segment has been modified or new write request or local merge are just partially done.
STAGE2_READY→REMOTE_DEST: index is ready for external segment transfer.
REMOTE_DEST→INIT: external file transfer complete.
... →INIT: each time there is a segment modification.

Stage 1 Checker

Assuming that the current time slot is T(0), for each index, a Stage 1 Checker will check all those nodes which have INIT index. If the segment file number of this index is >1, the state is changed to STAGE1_READY and the client application I/O pattern is checked during next period from T(0) to T(1). If both CPU usage history and Disk usage history are not 100%, the stage 1 merge begins to be planned.

For example, during T(0) to T(1), server 1 has free resources as follows, with the disk IO bandwidth calculated as follows:

Free CPU: 50%;
Free Disk1: 180*10*1200 (MAX: assuming 10 SATA, each 180 IOPS, for 20 min)
−150000=66000;
...

Stage 1 Executor

During T(0) to T(1), for all those indices which store segment file on this node, the merge rate is set using equation 1.4.

$$Optimizability_{serveri} * FreeCPU_{serveri} \quad (1.4)$$

Until T(1), the segment number N for this single index is checked. If N=1, node state as STAGE2_READY is marked; else, don't change the state.

During T(0) to T(1), for all indices which store segment file on a data node, the method of FIG. 5 is implemented.

Referring to FIG. 5, in a first step, the index data size of data segments in an index on one data node server is sorted in ascending order (step 502).

A next data segment with a minimum data size and data segment file number greater than 1 of the data node server is chosen (step 504).

The data segments of the index are added into the plan for merging, the merge rate is set, and the merge time length is estimated for the merging of the data segments into a single data segment for the index (step 506).

If the merge will not occupy the whole slot before T(1) (step 508), the method returns to step 504.

If the merge will occupy the whole slot before T(1) (step 508), the merge optimization plan is executed until T(1) (step 510), where the data segments are merged into a single data segment for the index and the method ends.

Stage 2 Checker

Assuming the current time slot is T(0), for each index, a Stage 2 Checker checks the state of each index which has index segment file spreading on multiple nodes. If the number of nodes which have an index with state STAGE2_READY is >=2, the merge for the index among these servers is planned. The resource pattern during next period: T(0) to T(1) is checked and each node is compared with segment file size M, total of disk IO, total IO, total of CPU free rate and totalCPU with some rules. For example, computing the value server priority (SP)= M*totalIO*totalCPU. The node with the max server priority (SP) is chosen and the state is changed to REMOTE_DEST.

Stage 2 Executor

A stage 2 executor checks all the data nodes for all index states of REMOTE_DEST for each index at STAGE2_READY status. The MergeData Size on all other servers with state as STAGE2READY are calculated using equation 1.5

$$MergeDataSize_{indexi} = \sum_{j=1}^{N-1} DataSize_{IndexOnServerj} \quad (1.5)$$

Referring to FIG. 6, in a first step, the data size of data segments in an index (merge data size) on all data node servers is sorted in ascending order (step 602).

The next data node server with a minimum data size is chosen (step 604).

All of the data size of this index among all the data node servers to merge is sorted (step 606).

The merge rate for this server is set (step 610).

If the merge cannot finish before T(1) (step 612), the merge optimization plan is executed until T(1) (step 616) where multiple data segments across multiple data node servers are merged and the method ends.

If the merge can finish before T(1) (step 612), and the merge is finished for the index (step 614), the method returns to step 604.

If the merge can finish before T(1) (step 612) and the merge is not finished for the index (step 614), the method returns to step 608 of choosing the next server with minimum data size.

After merge execution, the index state is changed as follows:

If the merge has been finished on all servers, the index state on each server of this index is changed to INIT.

If the merge has been finished on one server, but there are other servers of this index to be merged, the index state on this server is changed to the internal state of the merge progress.

It should be noted that whenever there is a write/modification request for a certain index on one server; if a merge optimization is not executing, the node's state is changed to INIT.

In an embodiment of the present invention, resource usage for client applications workload and data merge optimization of backend is balanced based on previous resource usage pattern in the distributed storage system allowing the distributed storage system to operate more efficiently by managing the resources of the system, so the client applications are not compromised.

The embodiments of the present invention provide a solution for both the local merge within one server and the remote merge across multiple servers, which considers the resource usage when doing merge optimization that will have the least impact on the resource usage for client application. Furthermore, the workload may be adjusted based on the forecasted workload pattern.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of planning data segment merging within a distributed storage system including a plurality of data node servers and a plurality of indices, each data node server of the plurality of data node servers having a plurality of data segments, the plurality of data node servers in communication with: a client application through an interface, a disk, and a data merge engine, the method comprising the steps of:
   collecting a record of usage statistics of the distributed storage system;
   analyzing a historical record of usage statistics collected to determine at least one usage pattern of the distributed storage system;
   estimating a workload of each of the plurality of data node servers and a length of time for a segment merge;
   determining a plan for merging; and
   sending the plan to the plurality of data node servers for implementation;
   wherein the plan for merging has a first stage of merging of data segments on one data node server and a second stage of merging of data segments across a set of the plurality of data node servers, wherein a set of data segments is distributed across the set of the plurality data node servers and is included in an index, the first stage including the steps of:
      the computer sorting data size of data segments in an index on the one data node server in ascending order;
      the computer choosing a data segment with a minimum data size and data segment file number greater than one;
      the computer adding the data segments of the index into the plan for merging, setting the merge rate, and estimating time length of merge for the data segments into a single data segment for the index; and
      the computer executing the merge of the data segments into a single data segment for the index; and
   the second stage including the steps of:
      identifying an index including a set of data segments, wherein the set of data segments is distributed across the set of data node servers;
      sorting, for each data node server of the set of data node servers, all data segments of the set of data segments stored on the each data node server by data size;
      choosing a data node server of the set of data node servers with a minimum data size;
      setting a merge rate for the data node server chosen; and executing a merge of each data segment stored on the data node server chosen included in the index into a single data segment of the data node server chosen.

2. The method of claim 1, further comprising, responsive to the merging being complete for all data node servers of the set of the plurality of data node servers within a preset amount of time, choosing another data node server with the minimum data size.

3. The method of claim 1, wherein the record of usage statistics of the distributed storage system comprises usage statistics of servers, disks, computer processors and network usage.

4. A computer program product for planning data segment merging within a distributed storage system including a plurality of data node servers and a plurality of indices, each data node server of the plurality of data node servers having a plurality of data segments, the plurality of data node servers in communication with: a client application through an interface, a disk, a data merge engine, and a computer comprising at least one processor, one or more memories, one or more computer readable storage media, the computer program product comprising a computer readable storage medium having program instructions embodied therewith, the program instructions executable by the computer to perform a method comprising:
  collecting a record of usage statistics of the distributed storage system;
  analyzing a historical record of usage statistics collected to determine at least one usage pattern of the distributed storage system;
  estimating a workload of each of the plurality of data node servers and a length of time for a segment merge;
  determining a plan for merging; and
  sending the plan to the plurality of data node servers for implementation;
  wherein the plan for merging has a first stage of merging of data segments on one data node server and a second stage of merging of data segments across a set of the plurality of data node servers, wherein a set of data segments is distributed across the set of the plurality of data node servers and is included in an index, the first stage including:
    sorting, by the computer, data size of data segments in an index on the one data node server in ascending order;
    choosing, by the computer, a data segment with a minimum data size and data segment file number greater than one;
    adding, by the computer, the data segments of the index into the plan for merging, setting the merge rate, and estimating, by the computer, time length of merge for the data segments into a single data segment for the index; and
    executing, by the computer, the merge of the data segments into a single data segment for the index; and
  the second stage including:
    identifying an index including a set of data segments, wherein the set of data segments is distributed across the set of data node servers;
    sorting, for each data node server of the set of data node servers, all data segments of the set of data segments stored on the each data node server by data size;
    choosing a data node server of the set of data node servers with a minimum data size;
    setting a merge rate for the data node server chosen; and
    executing a merge of each data segment stored on the data node server chosen included in the index into a single data segment of the data node server chosen.

5. The computer program product of claim 4, wherein the method performed by executing the program instructions further comprises, responsive to the merging being complete for all data node servers of the set of the plurality of data node servers within a preset amount of time, choosing another data node server with the minimum data size.

6. The computer program product of claim 4, wherein the record of usage statistics of the distributed storage system comprises usage statistics of servers, disks, computer processors and network usage.

7. A computer system for planning data segment merging within a distributed storage system including a plurality of data node servers and a plurality of indices, each data node server of the plurality of data node servers having a plurality of data segments, the plurality of data node servers in communication with: a client application through an interface, a disk, a data merge engine, the plurality of data node servers comprising a computer comprising at least one processor, one or more memories, one or more computer readable storage media having program instructions executable by the computer to perform operations comprising:
  collecting a record of usage statistics of the distributed storage system;
  analyzing a historical record of usage statistics collected to determine at least one usage pattern of the distributed storage system;
  estimating a workload of each of the plurality of data node servers and a length of time for a segment merge;
  determining a plan for merging; and
  sending the plan to the plurality of data node servers for implementation;
  wherein the plan for merging has a first stage of merging of data segments on one data node server and a second stage of merging of data segments across a set of the plurality of data node servers, wherein a set of data segments is distributed across the set of the plurality of data node servers and is included in an index from the plurality of indices, the first stage including:
    sorting, by the computer, data size of data segments in an index on the one data node server in ascending order;
    choosing, by the computer, a data segment with a minimum data size and data segment file number greater than one;
    adding, by the computer, the data segments of the index into the plan for merging, setting the merge rate, and estimating, by the computer, time length of merge for the data segments into a single data segment for the index: and
    executing, by the computer, the merge of the data segments into a single data segment for the index; and
  the second stage including:
    identifying an index including a set of data segments, wherein the index is included in the plurality of indices, and wherein the set of data segments is distributed across the set of data node servers;
    sorting, for each data node server of the set of data node servers, all data segments of the set of data segments stored on the each data node server by data size;
    choosing a data node server of the set of data node servers with a minimum data size;
    setting a merge rate for the data node server chosen; and executing a merge of each data segment stored on the data node server chosen included in the index into a single data segment of the data node server chosen.

8. The computer system of claim 7, wherein the operations performed be executing the program instructions further comprise, responsive to the merging being complete for all data node servers of the set of the plurality of data node servers within a preset amount of time, choosing another data node server with the minimum data size.

9. The computer system of claim 7, wherein the record of usage statistics of the distributed storage system comprises usage statistics of servers, disks, computer processors and network usage.

10. The method of claim 1, wherein the second stage includes the steps of:
- sorting, for each data node server of the set of the plurality of data node servers, all data segments of the set of data segments stored on the each data node server by data size;
- choosing a data node server of the set of the plurality of data node servers with a minimum data size;
- setting a merge rate for the data node server chosen; and
- executing a merge of each data segment stored on the data node server chosen included in the index into a single data segment of the data node server chosen.

11. The computer program product of claim 4, wherein the second stage includes:
- sorting, for each data node server of the set of the plurality of data node servers, all data segments of the set of data segments stored on the each data node server by data size;
- choosing a data node server of the set of the plurality of data node servers with a minimum data size;
- setting a merge rate for the data node server chosen; and
- executing a merge of each data segment stored on the data node server chosen included in the index into a single data segment of the data node server chosen.

12. The computer system of claim 7, wherein the second stage includes:
- sorting, for each data node server of the set of the plurality of data node servers, all data segments of the set of data segments stored on the each data node server by data size;
- choosing a data node server of the set of the plurality of data node servers with a minimum data size;
- setting a merge rate for the data node server chosen; and
- executing a merge of each data segment stored on the data node server chosen included in the index into a single data segment of the data node server chosen.

\* \* \* \* \*